US006973256B1

(12) United States Patent
Dagtas

(10) Patent No.: US 6,973,256 B1
(45) Date of Patent: Dec. 6, 2005

(54) SYSTEM AND METHOD FOR DETECTING HIGHLIGHTS IN A VIDEO PROGRAM USING AUDIO PROPERTIES

(75) Inventor: Serhan Dagtas, Croton-on-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 834 days.

(21) Appl. No.: 09/699,605

(22) Filed: Oct. 30, 2000

(51) Int. Cl.[7] .............................................. H04N 5/91
(52) U.S. Cl. ........................... 386/46; 386/96; 386/104
(58) Field of Search ............................... 386/46, 95, 96, 386/111, 125, 126; 369/30.07; 704/235

(56) References Cited

U.S. PATENT DOCUMENTS

| | | | |
|---|---|---|---|
| 5,136,655 A | | 8/1992 | Bronson ........................ 381/41 |
| 5,828,809 A | | 10/1998 | Chang et al. .................. 386/69 |
| 6,310,839 B1 | * | 10/2001 | Lee et al. ................. 369/30.07 |
| 6,332,120 B1 | * | 12/2001 | Warren ........................ 704/235 |
| 2002/0176689 A1 | * | 11/2002 | Heo et al. ...................... 386/46 |

FOREIGN PATENT DOCUMENTS

| | | |
|---|---|---|
| EP | 0780777 A1 | 6/1997 |
| EP | 0984367 A2 | 3/2000 |
| WO | 9612240 A1 | 4/1996 |
| WO | 9819450 A2 | 5/1998 |
| WO | WO 98/43408 * | 10/1998 |

OTHER PUBLICATIONS

Noboru Babaguchi , Tadahiro Kitahashi and Ramesh Jain, Detecting Events From Continuous Media by Intermodal Collaboration and Knowleedge Use, IEEE Sep. 1999, pp. 782-786.*
"Immersion into Visual Media: New Applications of Image Understanding", by Takeo Kanade, Robotics Institute, Feb. 1996, pp. 73-80.

* cited by examiner

Primary Examiner—Huy Nguyen

(57) ABSTRACT

There is disclosed an apparatus for detecting program highlights in a video program. The apparatus comprises: 1) a keyword detection circuit for detecting a location of a selected keyword in an audio track of the video program; and 2) an audio signal energy level detection circuit for determining an audio signal energy level of the audio track proximate the detected location of the selected keyword and comparing the audio signal energy level to a predetermined threshold. The audio signal energy level detection circuit, in response to a determination that the audio signal energy level exceeds the predetermined threshold, identifies the detected location of the selected keyword as a program highlight.

21 Claims, 4 Drawing Sheets

SYSTEM AND METHOD FOR DETECTING HIGHLIGHTS IN A VIDEO PROGRAM USING AUDIO PROPERTIES

TECHNICAL FIELD OF THE INVENTION

The present invention is directed, in general, to video playback devices and, more specifically, to a system for detecting and playing back the highlights of a video program, such as a sports program.

BACKGROUND OF THE INVENTION

A wide variety of video playback devices are available in the marketplace. Most people own, or are familiar with, a video cassette recorder (VCR), also referred to as a video tape recorder (VTR). More recently, video recorders that use computer magnetic hard disks rather than magnetic cassette tapes to store video programs have appeared in the market. For example, the ReplayTV™ recorder and the TiVO™ recorder digitally record television programs on hard disk drives using, for example, MPEG-2 compression. Additionally, some video playback devices may record on a readable/writable digital versatile disk (DVD) rather than a magnetic disk.

Virtually every system capable of playing video programs has a fast forward mode and a rewind mode that allow a viewer to selectively scan through recorded video programs. These modes are invaluable time savers. Many people use fast forward (FF) and rewind (REW) to view the interesting portions (i.e., the "highlights") of a program and to skip the uninteresting portions of a program, including the commercials. In a typical scenario, a sports fan may use fast forward mode to scan through a football game in a much shorter period of time, stopping the fast forward mode to view interesting plays (such as touchdowns or long passes) at normal speed.

However, this method of program viewing still requires a large amount of human interaction and is somewhat haphazard in nature. A viewer must constantly monitor the screen in fast forward motion in order to detect interesting events. The viewer often scans through most, if not all, of an interesting event (such as a touchdown) before realizing that something interesting is occurring. The viewer must then rewind slightly and replay the interesting event at normal speed.

A number of techniques have been introduced to automate the process of selectively viewing the highlights (or interesting events) in a video program, with only limited degrees of success. These prior art systems have used keyword-based methods that search for a defined library of words related to a video program, audio content-based methods that look for particular categories of sounds (i.e., speech, music, silence), and video processing methods that automatically parse a video program based on, for example, scene changes. Unfortunately, while selecting video highlights may be a straightforward task for a human, automatically detecting truly interesting events in a video program invariably proves to be a very error-prone process that requires a large amount of computational power.

Therefore, there is a need in the art for improved systems and methods that are capable of detecting interesting events in a video program. In particular, there is a need for a video playback device capable of recording a video program and identifying interesting events in the recorded video program. More particularly, there is a need for a video playback device capable of identifying the highlights in a recorded video program and selectively playing back the highlights in response to a subsequent viewer request.

SUMMARY OF THE INVENTION

To address the above-discussed deficiencies of the prior art, it is a primary object of the present invention to provide, for use in a video playback device capable of playing back a video program recorded on a storage medium in the video playback device, an apparatus for detecting program highlights in the video program. According to an advantageous embodiment of the present invention, the apparatus comprises: 1) a keyword detection circuit capable of detecting a location of a selected keyword in an audio track of the video program; and 2) an audio signal energy level detection circuit capable of determining an audio signal energy level of the audio track proximate the detected location of the selected keyword and comparing the audio signal energy level to a predetermined threshold.

According to one embodiment of the present invention, the audio signal energy level detection circuit, in response to a determination that the audio signal energy level exceeds the predetermined threshold, identifies the detected location of the selected keyword as a program highlight.

According to another embodiment of the present invention, the keyword detection circuit comprises a closed caption detector capable of capturing closed caption text in the video program and a processor for detecting keywords in the captured closed caption text.

According to still another embodiment of the present invention, the processor detects the keywords in the captured closed caption text by comparing the captured closed caption text to a plurality of keywords stored in a memory associated with the processor.

According to yet another embodiment of the present invention, the keyword detection circuit comprises an audio processor capable of executing a speech recognition application program that converts spoken words detected in the audio track to text words and wherein the audio processor is further capable of detecting keywords in the converted text words.

According to a further embodiment of the present invention, the audio processor detects the keywords in the converted text words by comparing the converted text words to a plurality of keywords stored in a memory associated with the processor.

According to a still further embodiment of the present invention, the audio signal energy level detection circuit determines the audio signal energy level of the audio track by determining an average audio signal energy level in a window proximate the detected location of the selected keyword.

According to a yet further embodiment of the present invention, the audio signal energy level detection circuit identifies the detected location of the selected keyword as a program highlight by determining a start point of the program highlight preceding the detected location of the selected keyword and by determining a stop point of the program highlight following the detected location of the selected keyword.

It is another primary object of the present invention to provide an apparatus for detecting program highlights in a video program that does not require the use of a keyword detection circuit. In one embodiment of the invention, the apparatus comprises 1) an audio signal energy level detection circuit capable of determining an audio signal energy level of N consecutive segments of the audio track and comparing the audio signal energy level to a predetermined threshold. The audio signal energy level detection circuit, in response to a determination that the audio signal energy level exceeds the predetermined threshold, identifies the N consecutive segments as a program highlight. In an exemplary embodiment, the program highlight is identified by determining N consecutive segments in which the average audio signal energy level exceeds the predetermined threshold.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged video playback device.

Figure 1:
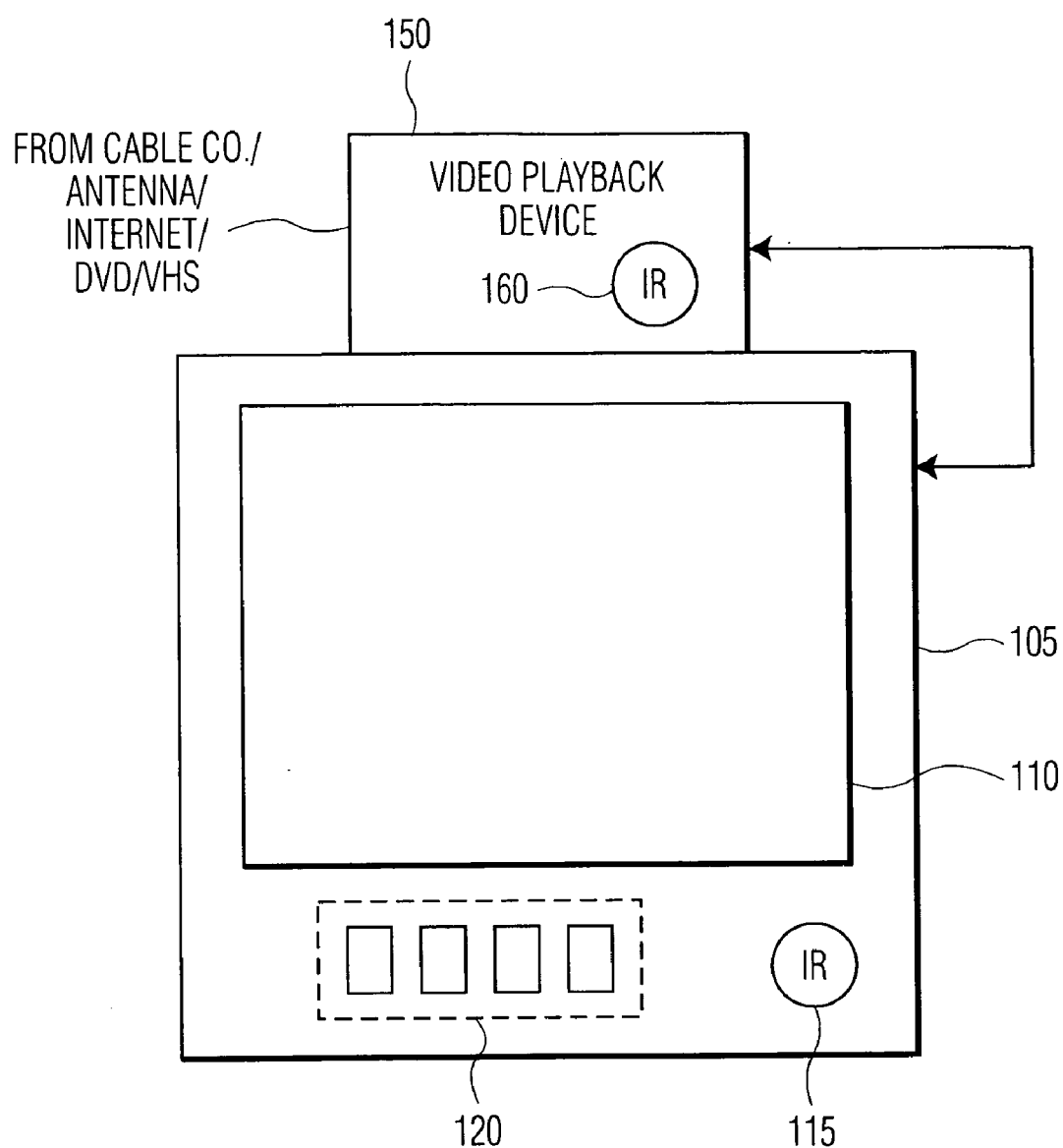
FIG. 1 illustrates an exemplary video playback device and a television set according to one embodiment of the present invention.

FIG. 1 illustrates exemplary video playback device 150 and television set 105 according to one embodiment of the present invention. Video playback device 150 receives incoming television signals from an external source, such as a cable television service provider (Cable Co.), a local antenna, the Internet, or a DVD or VHS tape player, and transmits a viewer-selected channel to television set 105. In Record mode, video playback device 150 may demodulate an incoming radio frequency (RF) television signal to produce a baseband video signal that is recorded and stored on a storage medium within or connected to video playback device 150. In Play mode, video playback device 150 reads a stored baseband video signal (i.e., program) selected by the user from the storage medium and transmits it to television set 105.

For example, if video playback device 150 is a video cassette recorder (VCR), also referred to as a video tape recorder (VTR), video playback device 150 stores incoming television signals to a magnetic cassette tape and retrieves stored television signals from the magnetic cassette tape. If video playback device 150 is a disk drive-based device, such as a ReplayTV™ recorder or a TiVO™ recorder, video playback device 150 stores the incoming television signals to a computer magnetic hard disk, rather than a magnetic cassette tape, and retrieves stored television signals from the hard disk. In still other embodiments, video playback device 150 may store and retrieve from a local read/write (R/W) digital versatile disk (DVD) or read-write (R-W) CD-ROM. Thus, the local storage medium may be fixed (i.e., hard disk drive) or removable (i.e., DVD, CD-ROM).

Video playback device 150 comprises infrared (IR) sensor 160 that receives commands (such as Channel Up, Channel Down, Volume Up, Volume Down, Record, Play, Fast Forward (FF), Rewind, and the like) from a remote control device operated by the viewer. Television set 105 is a conventional television comprising screen 110, infrared (IR) sensor 115, and one or more manual controls 120 (enclosed by a dotted line). IR sensor 115 also receives commands (such as Volume Up, Volume Down, Power ON/OFF) from a remote control device operated by the viewer.

It should be noted that video playback device 150 is not limited to receiving a particular type of incoming television signal from a particular type of source. As noted above, the external source may be a cable service provider, a conventional RF broadcast antenna, a satellite dish, an Internet connection, or another local storage device, such as a DVD player or a VHS tape player. In some embodiments, video playback device 150 may not even be able to record, but may be limited to playing back television signals that are retrieved from a removable DVD or CD-ROM. Thus, the incoming signal may be a digital signal, an analog signal, or Internet protocol (IP) packets. However, for the purposes of simplicity and clarity in explaining the principles of the present invention, the descriptions that follow shall generally be directed to an embodiment in which video playback device 150 receives incoming television signals (analog and/or digital) from a cable service provider. Nonetheless, those skilled in the art will understand that the principles of the present invention may readily be adapted for use with wireless broadcast television signals, local storage systems, an incoming stream of IP packets containing MPEG data, and the like.

Figure 2:
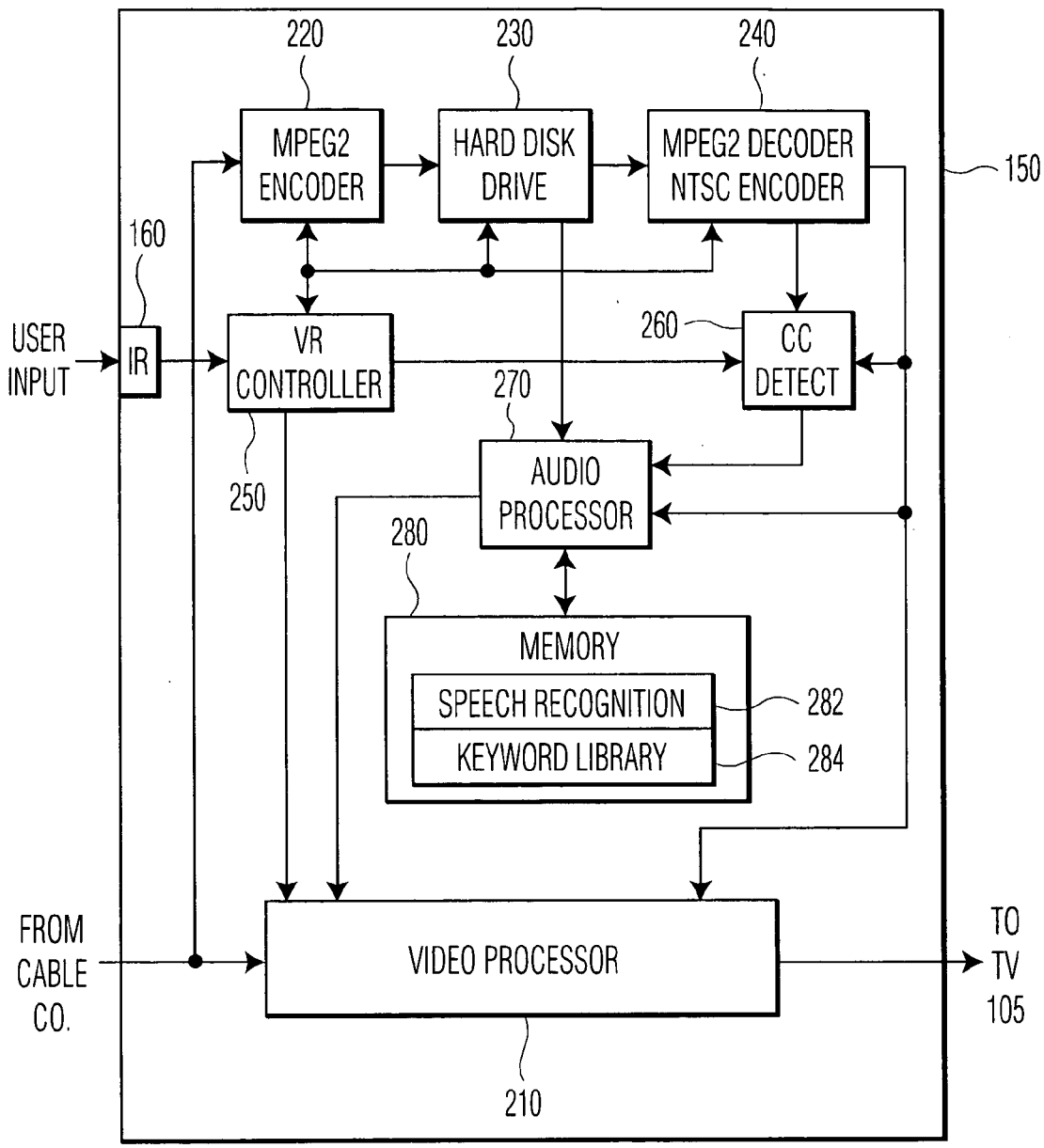
FIG. 2 illustrates in greater detail the exemplary video playback device according to one embodiment of the present invention.

FIG. 2 illustrates exemplary video playback device 150 in greater detail according to one embodiment of the present invention. Video playback device 150 comprises IR sensor 160, video processor 210, MPEG2 encoder 220, hard disk drive 230, MPEG2 decoder/NTSC encoder 240, and video recorder (VR) controller 250. Video playback device 150 further comprises closed caption (CC) detector 260, audio processor 270, and memory 280. VR controller 250 directs the overall operation of video playback device 150, including View mode, Record mode, Play mode, Fast Forward (FF) mode, Rewind mode, among others. According to the principles of the present invention, video playback device 150 also provides a Scan mode that plays back selected highlights from a video program as described below in greater detail.

In View mode, VR controller 250 causes the incoming television signal from the cable service provider to be demodulated and processed by video processor 210 and transmitted to television set 105, without storing or retrieving from hard disk drive 230. Video processor 210 contains radio frequency (RF) front-end circuitry for receiving incoming television signals from the cable service provider, tuning to a user-selected channel, and converting the selected RF signal to a baseband television signal (e.g., super video signal) suitable for display on television set 105. Video processor 210 also is capable of receiving a conventional NTSC signal from MPEG2 decoder/NTSC encoder 240 during Play mode and transmitting a baseband television signal to television set 105.

In Record mode, VR controller 250 causes the incoming television signal to be stored on hard disk drive 230. Under the control of VR controller 250, MPEG2 encoder 220 receives the incoming television signal from the cable service provider and converts the received RF signal to MPEG format for storage on hard disk drive 230. In Play mode, VR controller 250 directs hard disk drive 230 to stream the stored television signal (i.e., program) to MPEG2 decoder/NTSC encoder 240, which converts the MPEG2 data from hard disk drive 230 to, for example, a super video (S-Video) signal that is transmitted to television set 105. It should be noted that the choice of the MPEG2 standard for MPEG2 encoder 220 and MPEG2 decoder/NTSC encoder 240 is by way of illustration only. In alternate embodiments of the present invention, the MPEG encoder and decoder may comply with one or more of the MPEG-1, MPEG-2, MPEG-4, and MPEG-7 standards.

For the purposes of this application and the claims that follow, hard disk drive 230 is defined to include any mass storage device that is both readable and writable, including conventional magnetic disk drives and optical disk drives for read-write digital versatile disks (DVD-RW), re-writable CD-ROMs, VCR tapes and the like. In fact, hard disk drive 230 need not be fixed in the conventional sense that is permanently embedded in video playback device 150. Rather, hard disk drive 230 includes any mass storage device that is dedicated to video playback device 150 for the purpose of storing recorded video programs. Thus, hard disk drive 230 may include an attached peripheral drive or removable disk drives (whether embedded or externally attached), such as a juke box device that holds read-write DVDs or re-writable CD-ROMs. Furthermore, in an advantageous embodiment of the present invention, hard disk drive 230 may include external mass storage devices that video playback device 150 may access and control via a network connection (e.g., Internet protocol (IP) connection), including, for example, a disk drive in the user's home personal computer (PC) or a disk drive on a server at the user's Internet service provider (ISP).

During Play mode, VR controller 250 may receive a Scan command from a user via IR sensor 160. In Scan mode, video playback device 150 is capable of playing back only the highlights extracted from a video program (e.g., a sports program) stored on hard disk drive 230. To accomplish this, video playback device 150 may analyze a video program as it is being recorded to hard disk drive 230 (or after it has been recorded) and may use a combination of text-based searching and selected audio properties to automatically detect and label the highlight portions of the video program. During a subsequent Scan mode, video playback device 150 detects the labeled highlight portions of the stored video program and extracts only the labeled highlight portions for playback on television 105.

In an exemplary embodiment of the present invention, memory 280 may comprise a random access memory (RAM) that stores speech recognition program 282 and keyword (KW) library 284. Speech recognition program 282 comprises program instructions executed by audio processor 270 that detect spoken words in the audio track of a video program and convert the detected spoken words to text words. Audio processor 270 then compares the text words to selected keywords stored in keyword (KW) library 284. When a match occurs, audio processor 270 stores on hard disk drive 230 a keyword identifier associated with the corresponding segment of the stored video program. With respect to sports programs, keywords may include words and phrases such as touchdown, sack, interception, fumble, field goal, home run, run scored, triple, stolen base, three pointer, blocked shot, fast break, timeout called, goal, save, power play, hat trick, and the like.

In an alternate embodiment of the present invention, audio processor 270 may use text received from closed caption (CC) detector 260 to identify keywords in a video program. Closed caption detector 260 receives the video stream from the output of MPEG2 decoder/NTSC encoder 240 and detects CC text in the NTSC output signal. CC text is typically inserted in the blanking interval at the end of line 21 of the video signal. CC detector 260 uses a time stamp associated with each line of CC data to identify a segment of the video program corresponding to the CC text. CC detector 260 transmits each line of CC text and the time stamp to audio processor 270. Audio processor 270 then compares the CC text words to selected keywords stored in keyword (KW) library 284. When a match occurs, audio processor 270 stores on hard disk drive 230 a keyword identifier associated with the corresponding segment of the stored video program identified by the time stamp.

In actual sports broadcasts, many keywords may be used during routine conversations between announcers, rather than during a potential highlight event. This will result in a large number of "false positives" in which audio processor 270 attaches keyword identifiers to segments of a stored video program that do not correspond to highlights. To reduce the number of false positives, audio processor 270 also analyzes the audio track of the stored video program to identify periods of high audio energy (e.g., crowd noise) that correspond to occurrences of identified keywords in the stored video program.

Audio track information has been used effectively in recognizing, categorizing and segmenting video streams into segments with certain semantic characteristics. It has been used in speaker-based segmentation of news programs and spotting of keywords by means of speech recognition. Audio data can also be used very efficiently for content indexing because it requires significantly less processing power and storage space compared to video processing.

Audio processor 270 first performs a textual search of the audio track information. This step usually returns a long list of candidates (i.e., segments of the program that contain the specified keywords). As noted above, many of these segments do not represent a real highlight as commentators often use those words in reference to previous games or plays. Audio processor 270 then uses audio signal properties from each segment around a detected keyword to distinguish real highlights from false positives.

In an exemplary embodiment of the present invention, audio processor 270 processes audio track information in one (1) second long segments. Audio processor 270 computes audio excitement level, X (A), as the average absolute amplitude for each segment. If A is the audio signal, the excitement level, $X(A)=AVG(ABS(A))$, where ABS is the absolute value function. Next, audio processor 270 uses a sliding window of, for example, five (5) segments (equivalent to 5 seconds) to compute the average strengths, as in most situations true interesting events (i.e., highlights) last for at least five seconds. Then, groups of five segments with average excitement level above a certain threshold are combined to form a highlight sequence and are identified (i.e., marked) as a highlight on hard disk drive 230. In an exemplary embodiment, audio processor 270 may use a threshold that is one half of the maximum value over the entire program (i.e., approximately 2–3 hours for a sports program). In an alternate embodiment, audio processor 270 may use a threshold that is one half of the maximum value over an extended section of the program, such as a 10 minute or 15 minute block of the video program.

The present invention may also be used in connection with non-sports events, such as extracting highlights (i.e, jokes) from a talk show. To detect jokes or other highlights, audio processor 270 may use a variation of the audio-based algorithm outlined above for finding the "best" jokes from a talk show. For example, audio processor 270 may use a normalized excitement level, NX(A), to detect low volume laughter effects recorded in a studio environment, where $NX(A)=AVG(ABS(A))/MAX(ABS(A))$ and where ABS is the absolute value function. Audio processor 270 again may compute this value for every one (1) second long non-overlapping window and pick the highest values as candidates. In a second pass, audio processor 270 may eliminate isolated peaks and peaks that occur during commercials, at the very beginning or end of the program segments.

Figure 3:
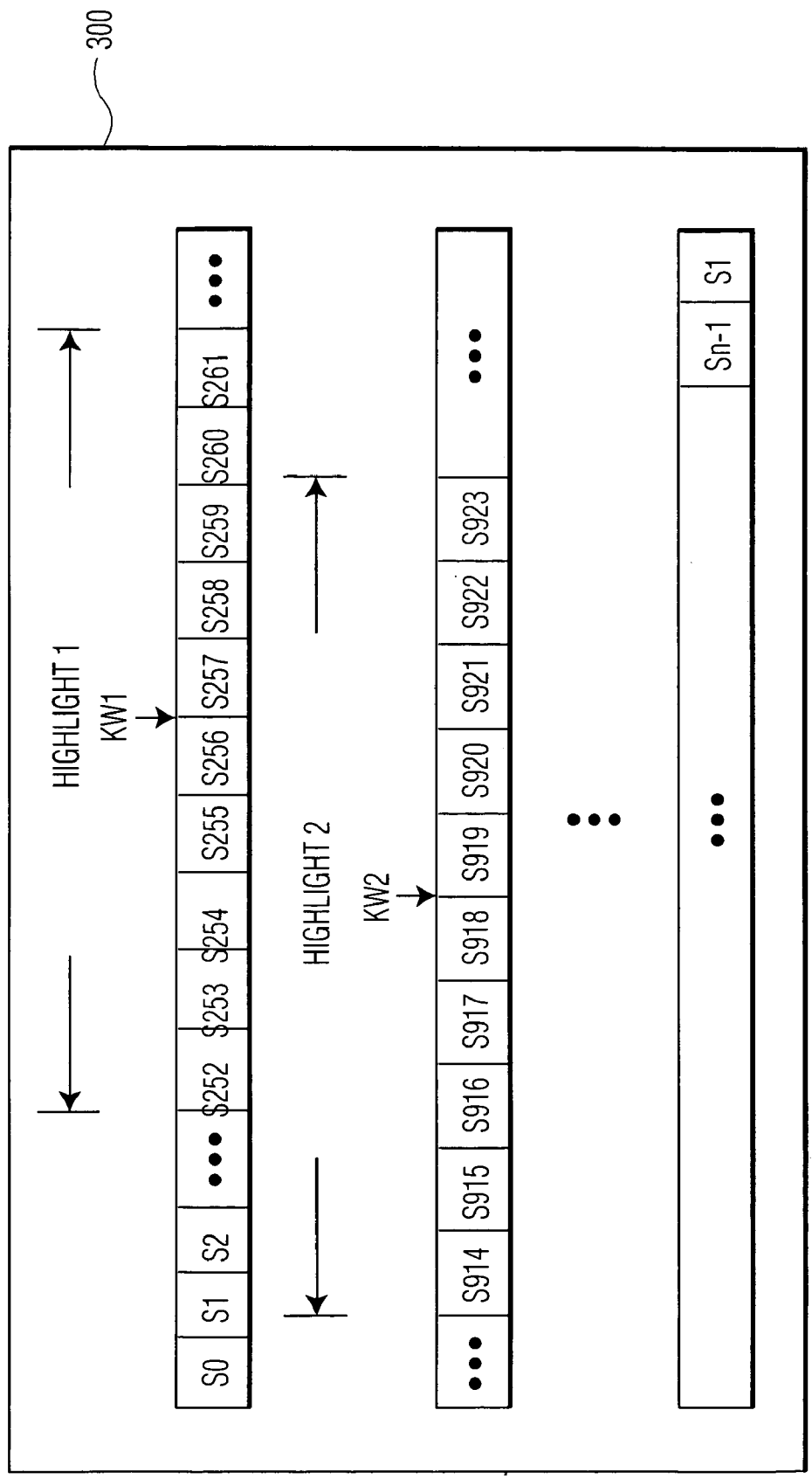
FIG. 3 illustrates an exemplary video program stored on a hard disk drive in the exemplary video playback device according to one embodiment of the present invention.

FIG. 3 illustrates exemplary video program 300 stored on hard disk drive 230 according to one embodiment of the present invention. Exemplary highlights in video program 300 have been identified and labeled by audio processor 270 for subsequent playback in Scan mode by video playback device 150. Video program 300 comprises a plurality of sequential one (1) second segments, S0 through Sn. The locations of two exemplary keywords, KW1 and KW2, are indicated. KW1 occurs approximately four minutes and sixteen seconds (i.e., 256 seconds) into video program 300, at the boundary of segments S256 and S257. KW2 occurs approximately fifteen minutes and eighteen seconds into video program 300, at the boundary of segments S918 and S919.

As a result of a determination by audio processor 270 that the audio energy level around KW1 and KW2 exceeds the predetermined threshold levels as described above, audio processor 270 has identified segments S252 and S261 as a highlight (labeled Highlight 1) and has identified segments S914 and S923 as a highlight (labeled Highlight 2). During Scan mode, video playback device 150 skips (or fast forwards) directly to Highlight 1 (rather than beginning at segment S0) and plays Highlight 1 (i.e., S252–S261) at normal speed. After Highlight 1 is played, video playback device 150 skips (or fast forwards through) segments S262–S913 between Highlight 1 and Highlight 2 and plays Highlight 2 (i.e., S914–S923) at normal speed.

In exemplary video program 300, the lengths of Highlights 1 and 2 (i.e., 10 seconds) are by way of illustration only. In alternate embodiments, audio processor 270 may identify highlights associated with keywords that are larger or smaller than the exemplary 10 second highlights. For example, audio processor 270 may identify highlights that are 20 seconds, 30 seconds long, or a user-defined length. Additionally, there is no requirement that the keyword be located at the center of a highlight. For example, audio processor 270 may identify a 30 second highlight as the 20 seconds preceding and the 10 seconds following a keyword that occurs during a period of high audio signal energy level.

Finally, there is no requirement that the length of the highlight identified by audio processor 270 be the same as the length of the period of high audio signal energy level surrounding the keyword. In the description above, audio processor 270 looked for a five second window coinciding with the occurrence of a keyword during which the average audio excitement level exceeded a predetermined threshold level. However, once audio processor 270 detects such a five second window and determines that a highlight exists, audio processor 270 may define the highlight as the 20 seconds preceding and the 10 seconds following the keyword. In this manner, video playback device 150 may playback a period of relatively low audio excitement that leads up to the occurrence of a significant event.

Figure 4:
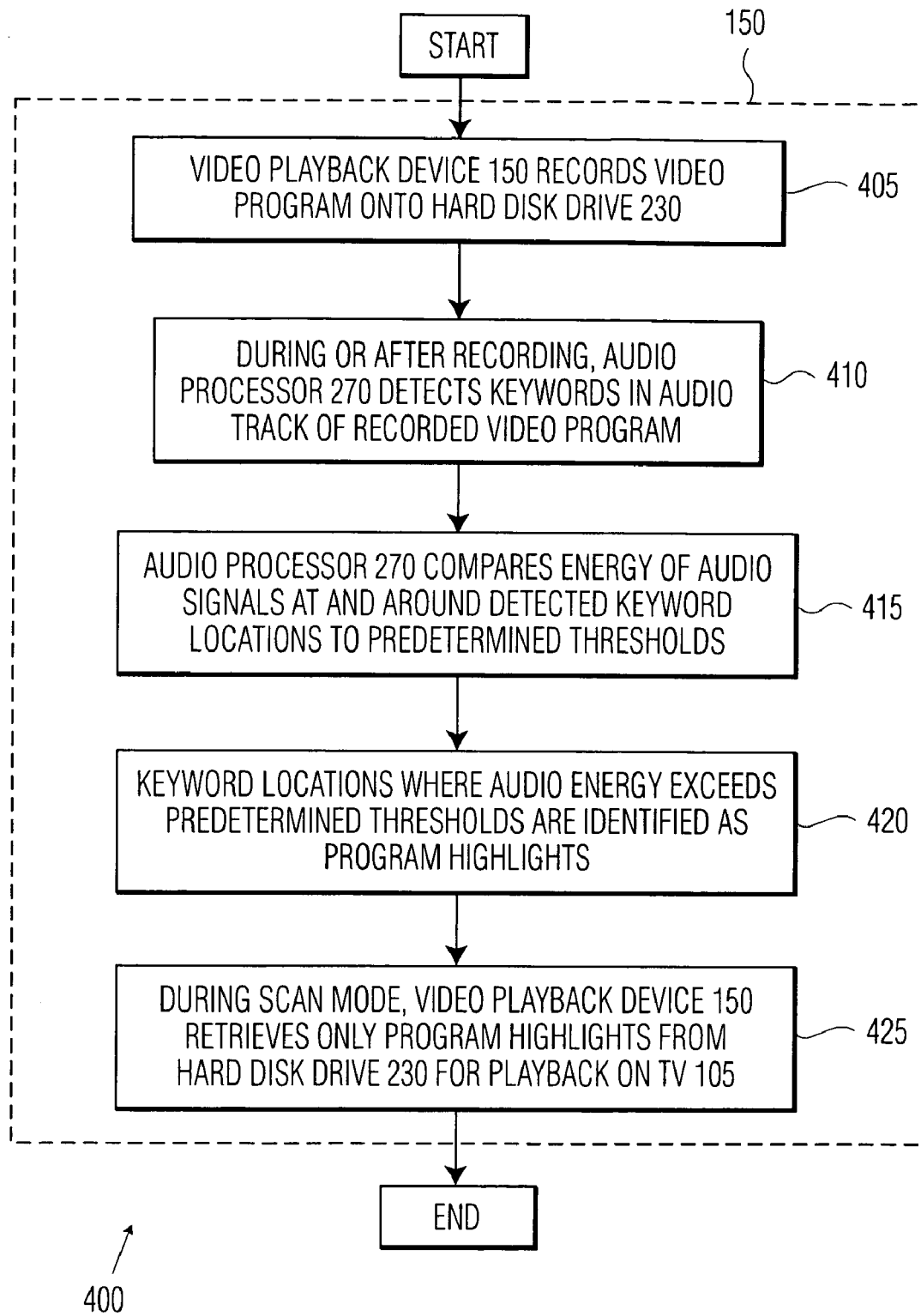
FIG. 4 is a flow diagram illustrating the operation of the exemplary video playback device according to one embodiment of the present invention.

FIG. 4 depicts flow diagram 400, which illustrates the operation of exemplary video playback device 150 according to one embodiment of the present invention. The process of generating and watching video highlights begins when video playback device 150 records a video program onto hard disk drive 230 (process step 405). Video playback device 150 may record the video program at a programmed time or in response to a manual RECORD command by a viewer operating the remote control. Next, audio processor 270 detects keywords in the audio track of the recorded video program.

The keywords may be detected by comparing words detected by speech recognition program 282 to keywords stored in keyword library 284 or by comparing text received from closed caption (CC) detector 260 to keywords stored in keyword library 284. Audio processor 270 may detect the keywords during the recording of the video program (i.e., in real time) or may detect the keywords after the video program has been recorded (i.e., off-line) (process step 410).

At each location where a keyword occurs, audio processor 270 compares the energy of the audio signals in a variable-sized window disposed around the location of each keyword to a predetermined threshold, as previously described (process step 415). If the audio signal energy levels in the window exceed the threshold, audio processor 270 identifies the keyword location as a video program highlight (process step 420). To identify the keyword location as a highlight, audio processor 270 may insert detectable markers (or flags) at the start point and the end point of each highlight in the video program. If the recorded video program is stored on a disk drive, audio processor may identify the location of each highlight by storing the start point address and the stop point address of each highlight in a data file associated with the video program. As noted above, the length and position of the highlight with respect to the position of the detected keyword may be variable. In an advantageous embodiment, the length and position of the highlight may be varied by the user through a graphical user interface on TV 105 controlled by VR controller 250. Finally, during Scan mode, video playback device 150 retrieves only the video program highlights from hard disk drive 230 for playback on TV 105 (process step 425).

Although the present invention has been described in detail, those skilled in the art should understand that they can make various changes, substitutions and alterations herein without departing from the spirit and scope of the invention in its broadest form.

What is claimed is:

1. For use in a video playback device capable of playing back a video program recorded on a storage medium in said video playback device, an apparatus for detecting program highlights in said video program comprising:
   a keyword detection circuit capable of detecting a location of a selected keyword in an audio track of said video program; and
   an audio signal energy level detection circuit capable of determining an audio signal energy level of said audio track proximate said detected location of said selected keyword and comparing said audio signal energy level to a predetermined threshold;
   wherein said audio signal energy level detection circuit, in response to a determination that said audio signal energy level exceeds said predetermined threshold, identifies said detected location of said selected keyword as a program highlight;
   wherein said audio signal energy level detection circuit identifies said detected location of said selected keyword as a program highlight by determining a start point of said program highlight preceding said detected location of said selected keyword and by determining a stop point of said program highlight of said program highlight following said detected location of said selected keyword; and
   wherein said apparatus for detecting program highlights varies said location of said start point and said stop point of said program highlight in response to a user input.

2. The apparatus as set forth in claim 1 wherein said keyword detection circuit comprises a closed caption detector capable of capturing closed caption text in said video program and a processor for detecting keywords in said captured closed caption text.

3. The apparatus as set forth in claim 2 wherein said processor detects said keywords in said captured closed caption text by comparing said captured closed caption text to a plurality of keywords stored in a memory associated with said processor.

4. The apparatus as set forth in claim 1 wherein said keyword detection circuit comprises an audio processor capable of executing a speech recognition application program that converts spoken words detected in said audio track to text words and wherein said audio processor is further capable of detecting keywords in said converted text words.

5. The apparatus as set forth in claim 4 wherein said audio processor detects said keywords in said converted text words by comparing said converted text words to a plurality of keywords stored in a memory associated with said processor.

6. The apparatus as set forth in claim 1 wherein said audio signal energy level detection circuit determines said audio signal energy level of said audio track by determining an average audio signal energy level in a window proximate said detected location of said selected keyword.

7. A video playback device comprising:
   a storage device capable of storing thereon a plurality of video programs;
   video recording circuitry capable of receiving an incoming video program and storing said incoming video program on said storage device; and
   an apparatus for detecting program highlights in said incoming video program comprising:
   a keyword detection circuit capable of detecting a location of a selected keyword in an audio track of said incoming video program; and
   an audio signal energy level detection circuit capable of determining an audio signal energy level of said audio track proximate said detected location of said selected keyword and comparing said audio signal energy level to a predetermined threshold;
   wherein said audio signal energy level detection circuit, in response to a determination that said audio signal energy level exceeds said predetermined threshold, identifies said detected location of said selected keyword as a program highlight;
   wherein said audio signal energy level detection circuit identifies said detected location of said selected keyword as a program highlight by determining a start point of said program highlight preceding said detected location of said selected keyword and by determining a stop point of said program highlight of said program highlight following said detected location of said selected keyword; and
   wherein said apparatus for detecting program highlights varies said location of said start point and said stop point of said program highlight in response to a user input.

8. The video playback device as set forth in claim 7 wherein said keyword detection circuit comprises a closed caption detector capable of capturing closed caption text in said video program and a processor for detecting keywords in said captured closed caption text.

9. The video playback device as set forth in claim 8 wherein said processor detects said keywords in said captured closed caption text by comparing said captured closed caption text to a plurality of keywords stored in a memory associated with said processor.

10. The video playback device as set forth in claim 7 wherein said keyword detection circuit comprises an audio processor capable of executing a speech recognition application program that converts spoken words detected in said audio track to text words and wherein said audio processor is further capable of detecting keywords in said converted text words.

11. The video playback device as set forth in claim 10 wherein said audio processor detects said keywords in said converted text words by comparing said converted text words to a plurality of keywords stored in a memory associated with said processor.

12. The video playback device as set forth in claim 7 wherein said audio signal energy level detection circuit determines said audio signal energy level of said audio track by determining an average audio signal energy level in a window proximate said detected location of said selected keyword.

13. For use in a video playback device capable of playing back a video program recorded on a storage medium in the video playback device, a method for detecting program highlights in the video program comprising the steps of:
    detecting a location of a selected keyword in an audio track of the video program;
    determining an audio signal energy level of the audio track proximate the detected location of the selected keyword;
    comparing the audio signal energy level to a predetermined threshold;
    determining if the audio signal energy level exceeds the predetermined threshold;
    in response to a determination that the audio signal energy level exceeds the predetermined threshold, identifying the detected location of the selected keyword as a program highlight;
    determining a start point of said program highlight preceding said detected location of said selected keyword;
    determining a stop point of said program highlight following said detected location of said selected keyword; and
    varying said location of said start point and said stop point of said program highlight in response to a user input.

14. The method as set forth in claim 13 wherein the step of detecting a location of a keyword comprises the substeps of:
    capturing closed caption text in the video program; and
    detecting keywords in the captured closed caption text.

15. The method as set forth in claim 14 wherein the step of detecting keywords in the captured closed caption text comprises the substep of comparing the captured closed caption text to a plurality of keywords stored in a keyword library associated with the video playback device.

16. The method as set forth in claim 13 wherein the step of detecting a location of a keyword comprises the substeps of:
    executing a speech recognition application program that converts spoken words detected in the audio track to text words; and
    detecting keywords in the converted text words.

17. The method as set forth in claim 16 wherein the step of detecting keywords in the converted text words comprises the substep of comparing the converted text words to a plurality of keywords stored in a keyword library associated with the video playback device.

18. The method as set forth in claim 13 wherein the step of determining the audio signal energy level comprises the substep of determining an average audio signal energy level in a window proximate the detected location of the selected keyword.

19. For use in a video playback device capable of playing back a video program recorded on a storage medium in said video playback device, an apparatus for detecting program highlights in said video program comprising:
    an audio signal energy level detection circuit capable of determining an audio signal energy level of N consecutive segments of said audio track and comparing said audio signal energy level to a predetermined thresholds
    wherein said audio signal energy level detection circuit, in response to a determination that said audio signal energy level exceeds said predetermined threshold, identifies said detected location of said selected keyword as a program highlight;
    wherein said audio signal energy level detection circuit identifies said detected location of said selected keyword as a program highlight by determining a start point of said program highlight preceding said detected location of said selected keyword and by determining a stop point of said program highlight of said program highlight following said detected location of said selected keyword; and
    wherein said apparatus for detecting program highlights varies said location of said start point and said stop point of said program highlight in response to a user input.

20. The apparatus as set forth in claim 19 wherein said audio signal energy level detection circuit, in response to a determination that said audio signal energy level exceeds said predetermined threshold, identifies said N consecutive segments as a program highlight.

21. The apparatus as set forth in claim 20 wherein said audio signal energy level detection circuit determines said audio signal energy level of said audio track by determining an average audio signal energy level of said N consecutive segments.

* * * * *